(12) United States Patent  (10) Patent No.: US 9,262,154 B2
Challa et al.  (45) Date of Patent: Feb. 16, 2016

(54) ENHANCED UPGRADE PATH

(71) Applicant: Accenture Global Services Limited, Dublin (IE)

(72) Inventors: Prabhakar Challa, Streamwood, IL (US); Jingying Li, Fishers, IN (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/737,088

(22) Filed: Jun. 11, 2015

(65) Prior Publication Data

US 2015/0309785 A1  Oct. 29, 2015

Related U.S. Application Data

(63) Continuation of application No. 13/892,914, filed on May 13, 2013, now Pat. No. 9,075,688, which is a continuation of application No. 12/821,276, filed on Jun. 23, 2010, now Pat. No. 8,443,084.

(60) Provisional application No. 61/302,913, filed on Feb. 9, 2010.

(51) Int. Cl.
*G06F 9/44* (2006.01)
*G06F 9/445* (2006.01)

(52) U.S. Cl.
CPC .. *G06F 8/65* (2013.01); *G06F 8/60* (2013.01); *G06F 8/61* (2013.01); *G06F 8/71* (2013.01)

(58) Field of Classification Search
CPC ..... G06F 8/65; G06F 9/4856; G06F 9/45558; H04L 67/34
See application file for complete search history.

(56) References Cited

U.S. PATENT DOCUMENTS

| | | | |
|---|---|---|---|
| 6,334,215 B1 | 12/2001 | Barker | |
| 6,529,784 B1 | 3/2003 | Cantos | |
| 7,246,351 B2 | 7/2007 | Bloch | |
| 7,584,131 B1 | 9/2009 | Kurtz | |
| 7,793,306 B2 * | 9/2010 | Vasudevan | G06F 8/65 719/320 |
| 7,823,145 B1 | 10/2010 | Le | |
| 7,853,945 B2 | 12/2010 | Kramer | |
| 8,166,477 B1 * | 4/2012 | Tormasov | G06F 9/4418 718/1 |
| 8,201,163 B2 | 6/2012 | Walker | |
| 8,245,219 B2 | 8/2012 | Agarwal | |
| 8,370,837 B2 * | 2/2013 | Emelianov | G06F 9/45558 714/13 |
| 8,429,630 B2 * | 4/2013 | Nickolov | G06F 9/4856 717/110 |

(Continued)

FOREIGN PATENT DOCUMENTS

CN 1886729 A 12/2006
WO WO0065438 A3 11/2000

OTHER PUBLICATIONS

Smith et al., Migration of Legacy Assets to Service-Oriented Architecture Environments, May 2007, 2 pages.*

(Continued)

*Primary Examiner* — Thuy Dao
(74) *Attorney, Agent, or Firm* — Fish & Richardson P.C.

(57) ABSTRACT

Methods, systems, and apparatus, including computer programs encoded on a computer storage medium, for establishing upgrade paths. In one aspect, a method includes establishing an interim environment and platform, migrating the data from the legacy environment and platform to the interim environment and platform, and migrating the data from the interim environment and platform to the upgraded environment and platform.

20 Claims, 8 Drawing Sheets

(56) References Cited

U.S. PATENT DOCUMENTS

| | | | |
|---|---|---|---|
| 8,443,084 | B2 | 5/2013 | Challa |
| 8,677,340 | B2 | 3/2014 | Dube |
| 8,776,038 | B2 | 7/2014 | Larimore |
| 9,063,817 | B2* | 6/2015 | Dorn .................. G06F 8/65 |
| 2002/0111972 | A1 | 8/2002 | Lynch |
| 2002/0174422 | A1 | 11/2002 | Kelley |
| 2005/0102240 | A1 | 5/2005 | Misra |
| 2005/0278432 | A1 | 12/2005 | Feinleib |
| 2006/0041862 | A1 | 2/2006 | Moussallam |
| 2007/0234346 | A1 | 10/2007 | Kramer |
| 2008/0045342 | A1 | 2/2008 | Crowder |
| 2008/0115010 | A1* | 5/2008 | Rothman ............ G06F 1/206 714/10 |
| 2008/0115123 | A1 | 5/2008 | Kelly |
| 2010/0257522 | A1 | 10/2010 | Malamud |
| 2011/0145380 | A1* | 6/2011 | Glikson ............ G06F 9/4856 709/223 |

OTHER PUBLICATIONS

Drumm et al., Quickmig: automatic schema matching for data migration projects, Nov. 2007, 10 pages.*

D. Mosley, When to migrate legacy embedded applications, Nov. 2006, 3 pages.*

European Communication in European Application No. 10015481.4, dated Feb. 19, 2013, 5 pages.

Extended European Search Report for Application No. 10015481.4-1243 / 2365437 dated Sep. 8, 2011, 6 pages.

Office Action in Chinese Application No. 201010592521.2, dated Sep. 2, 2014, 18 pages (with English translation).

U.S. Non-Final Office Action for U.S. Appl. No. 12/821,276, dated Apr. 2, 2012, 17 pages.

U.S. Notice of Allowance for U.S. Appl. No. 13/892,914, dated Nov. 21, 2014, 8 pages.

Wong, Kickin it old school!: dealing with legacy applications, Oct. 2008, 4 pages.

Muller et al., Constructing component-based extension interfaces in legacy systems code, Sep. 2004, 6 pages.

D. Wong, Kickin it old school!: dealing with legacy applications, Oct. 2008, 4 pages.

Federico Zoufaly. Issues and Challenges Facing Legacy Systems [online], [retrieved on Feb. 23, 2015]. Retrieved from the Internet: http://www.developer.com/mgmt/article.php/1492531/Issues-and-Challenges-Facing-Lega . . . Feb. 23, 2015, 4 pages.

U.S. Notice of Allowance for U.S. Appl. No. 13/892,914, dated Mar. 6, 2015, 10 pages.

Besacier et al., Toward user interface virtualization: legacy applications and innovative interaction systems, Jul. 2009, 9 pages.

Ahmad et al., A framework for architecture-driven migration of legacy systems to cloud-enabled software, Apr. 2004, 8 pages.

Song et al., Rapid GUI development on legacy systems: a runtime model-based solution, Oct. 2012, 6 pages.

* cited by examiner

ENHANCED UPGRADE PATH

CROSS-REFERENCE TO RELATED APPLICATIONS

This application is a continuation application of, and claims priority under 35 U.S.C. §120 to, U.S. patent application Ser. No. 13/892,914 filed May 13, 2013, which is a continuation of U.S. patent application Ser. No. 12/821,276 filed Jun. 23, 2010 (now U.S. Pat. No. 8,443,084 issuing May 14, 2013) entitled "Enhanced Upgrade Path," which claims priority under 35 U.S.C. §119(e)(1) to U.S. Provisional Application Ser. No. 61/302,913, filed Feb. 9, 2010. The disclosures of the foregoing applications are incorporated herein by reference in their entirety.

STATEMENT CONCERNING GOVERNMENT RIGHTS

The inventions disclosed in this specification were made with Government support under TIRNO-06-D-00006 TO 08, awarded by the Internal Revenue Service. The Government has certain rights in these inventions.

BACKGROUND

This specification generally describes processes for establishing upgrade paths between incompatible application environments and platforms. As used by this specification, the term "environment" (or "application environment") refers to one or more software applications, database systems, or virtual computing states, while the term "platform" refers to the underlying operating system, firmware, and hardware upon which the environment has been installed.

Due to the evolving nature of hardware and software, application environments and platforms typically need to be upgraded and updated. The term "upgrade" refers to the replacement of a product with a newer version of the same product, for example by replacing software or firmware with a newer or better version in order to bring a system up-to-date or to improve its characteristics. "Updating" refers to applying patches to fix problems with software applications or supporting data. Though upgrading and updating are intended to address problems, in certain circumstances upgrades or updates may sometimes introduce new problems.

Digital content, such as media, data, or files, that is generated within one platform or environment may not be recognized or rendered appropriately by another platform or environment. In some circumstances, the installation of a particular environment may require that digital content be migrated from another environment.

When faced with limited resources, an organization may choose to not apply upgrades or updates to software applications or application environments at the same pace as the upgrades or updates are published by the software manufacturer. Such a delay may result in a situation where no direct upgrade path exists between a legacy version of the software application and the latest version of the software application. A direct upgrade path, for example, may include one or more established or automated upgrade processes for installing new capabilities or for migrating digital content between a legacy environment or platform and an upgraded environment or platform.

When an organization chooses to not upgrade a legacy environment or platform when an update becomes available, the state of the legacy environment or platform may, in time, become 'out of sync' with automated upgrade processes supported by the software manufacturers. When 'out of sync,' an attempt to automatically upgrade the legacy environment or platform, or to migrate content to an upgraded environment or platform, may result in errors being generated by the automated upgrade process. Such errors may prevent the upgrade process from being fully completed.

SUMMARY

In general, one innovative aspect of the subject matter described in this specification may be embodied in processes used for establishing upgrade paths between incompatible environments or platforms, for the purpose of migrating data.

This specification refers to an application platform that hosts a software application that is to receive an upgrade or update, as a "legacy" platform, and refers to an application platform that hosts an upgraded or updated version of the software application as an "upgraded" platform. Where upgrade path has not been established between a legacy environment and platform and an upgraded environment and platform, an intermediate platform (referred to by this specification as an "interim" platform) may be established as a bridge to address any potential incompatibilities.

An incompatibility occurs when any attempt at automatically upgrading or updating the legacy platform in the direction of the desired upgraded platform results in an unanticipated error condition, or where the software manufacturer does not support or provide assistance in upgrading or updating from the legacy platform to the upgraded platform. An incompatibility, for example, may occur when an upgraded environment or platform is not capable of recognizing digital content generated by a legacy platform. In another example, an incompatibility may occur when no software manufacturer-supported automated upgrade or update process exists to move from a legacy platform to an upgraded platform, for example because one or more elements of the legacy environment are no longer supported by the software manufacturer, and thus are not present within the upgraded environment.

In general, another innovative aspect of the subject matter described in this specification may be embodied in processes used for migrating data from a legacy environment installed on a legacy environment and platform, to an upgraded environment installed on a upgraded environment and platform, where the legacy environment is not compatible with the upgraded environment and platform, and wherein the upgraded environment is not compatible with the legacy environment and platform, the processes including the actions of establishing an interim environment and platform, migrating the data from the legacy environment and platform to the interim environment and platform, and migrating the data from the interim environment and platform to the upgraded environment and platform.

Other embodiments of these aspects include corresponding systems, apparatus, and computer programs, configured to perform the actions of the methods, encoded on computer storage devices.

These and other embodiments may each optionally include one or more of the following features. For instance, establishing the interim environment and platform includes replacing a data conversion and re-conversion operation with a copy operation in an installation process associated with the interim environment, and invoking the installation process, and migrating the data from the legacy environment and platform to the interim environment and platform includes copying the data from the legacy environment and platform to the interim environment and platform using the copy operation instead of the data conversion and re-conversion operation, and storing the copy of the data by the interim environment and platform; migrating the data from the interim environment and platform to the upgraded environment and platform includes performing a restore operation by the upgraded environment and platform to import the copy of the data stored by the interim environment and platform; replacing the data conversion and re-conversion operation with a copy operation further includes replacing an R3LOAD operation with an R3COPY operation; establishing the interim environment and platform further includes invoking an installation process associated with the interim environment and platform, wherein the installation process includes an operating system confirmation operation that confirms that the interim environment and platform is executing a legacy operating system, and wherein the installation process further includes an upgraded operating system requirement operation that requires the interim environment and platform to be executing an upgraded operating system, pausing the installation process after the operating system confirmation operation has been performed, and before the upgraded operating system requirement operation has been performed; replacing the legacy operating system on the interim environment and platform with the upgraded operating system, during the pause in the installation process; and restarting the installation process after replacing the legacy operating system on the interim environment and platform with the upgraded operating system; replacing the legacy operating system on the interim environment and platform with the upgraded operating system further includes replacing files associated with the legacy operating system with files associated with the upgraded operating system, and rebooting the interim platform; the actions further include performing a collation conversion on the data before migrating the data to the upgraded environment and platform; the collation conversion is performed on the data before migrating the data to the interim environment and platform; performing a collation conversion on the data further includes performing a bin to bin2 collation conversion on the data; establishing the interim environment and platform further includes lowering a compatibility mode associated with the interim environment; establishing the interim environment and platform further includes determining that an installation process associated with the interim environment has automatically raised the compatibility mode associated with the interim environment, and the compatibility mode associated with the interim environment is lowered in response to determining that the installation process associated with the interim environment has automatically raised the compatibility mode associated with the interim environment; the legacy environment and platform includes a 32-bit, WINDOWS 2000 operating system, the interim environment and platform includes a 64-bit, WINDOWS 2003 operating system, and the upgraded environment and platform includes a 64-bit, WINDOWS 2008 operating system; the legacy environment includes a MICROSOFT SQL SERVER 2000 database application, the interim environment includes a MICROSOFT SQL SERVER 2005 database application, and the upgraded environment includes a MICROSOFT SQL SERVER 2008 database application; and/or the legacy environment includes an SAP ENTERPRISE RESOURCE PLANNING (ERP) version 4.6C software application, and the interim and upgraded environments include an SAP ERP CENTRAL COMPONENT (ECC) version 6.0 software application.

Particular embodiments of the subject matter described in this specification may be implemented to realize one or more of the following advantages. Specifically, environments or platforms may be upgraded less frequently, saving an organization money and time. Data integrity may be assured even if no direct path of data migration exists between a legacy environment or platform and an upgraded environment or platform. The information technology (IT) department of an organization may have greater flexibility in selecting an upgrade or update schedule. In some implementations, an organization may move from a legacy environment or platform to an upgraded environment or platform without violating a customer support contract between the organization and the software manufacturer.

The details of one or more embodiments of the subject matter described in this specification are set forth in the accompanying drawings, and the description, below. Other features, aspects and advantages of the subject matter will be apparent from the description and drawings, and from the claims.

BRIEF DESCRIPTION OF DRAWINGS

Referring now to the drawings, in which like reference numbers represent corresponding parts throughout.

DETAILED DESCRIPTION

Figure 1:
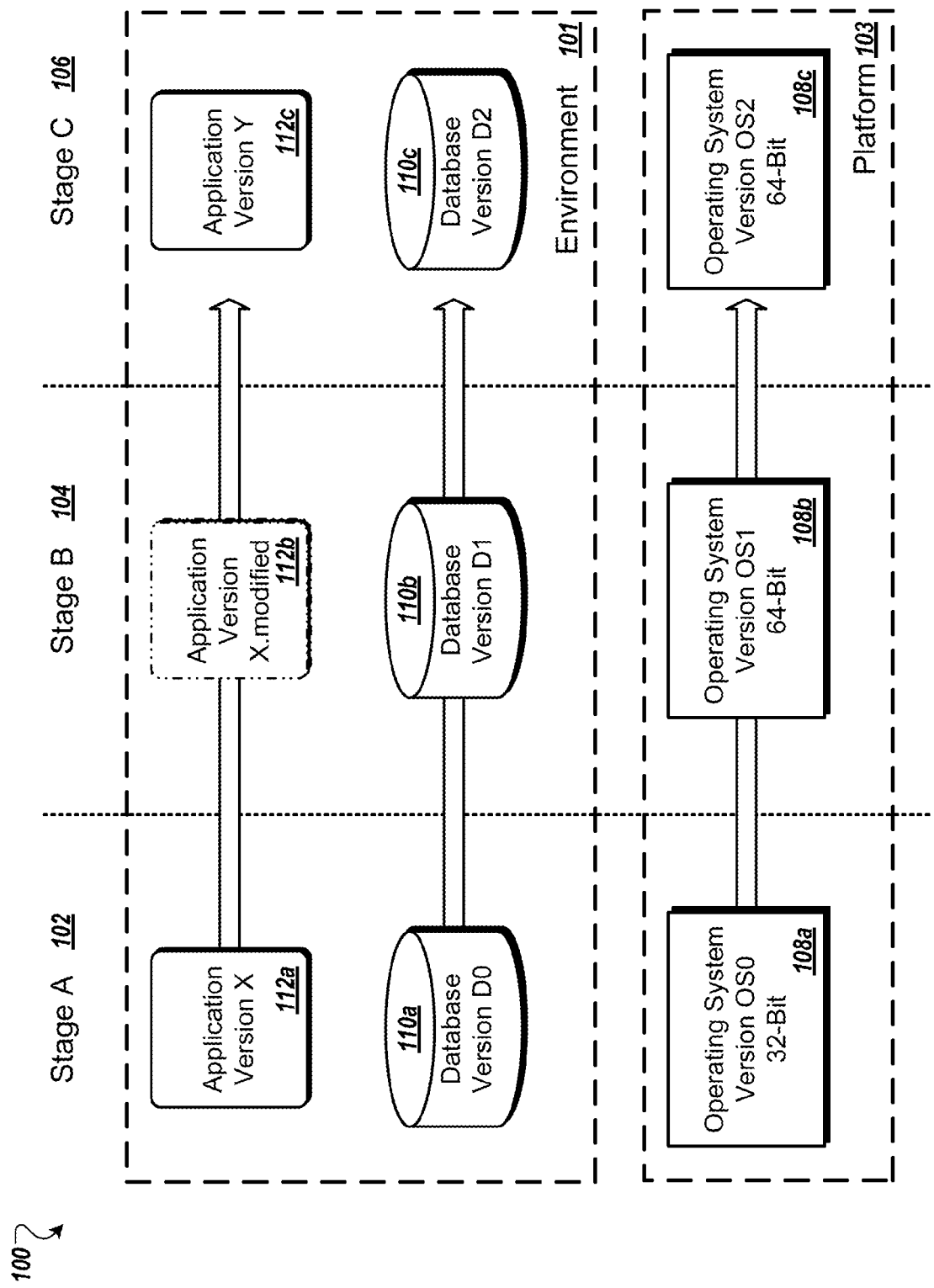
FIG. 1 is a block diagram illustrating an example upgrade path between incompatible environments or platforms, the upgrade path using an interim environment and platform established as a bridge between a legacy environment and platform and an upgraded environment and platform.

FIG. 1 is a block diagram illustrating an example upgrade path 100 between incompatible environments or platforms, the upgrade path using an interim environment and platform established as a bridge between a legacy environment and platform and an upgraded environment and platform. The upgrade path 100 includes three stages, each stage including an environment portion 101 and a platform portion 103. In general, the environment portion 101 includes software applications or software-enabled environments, such as a database environment. The platform portion 103 includes hardware or firmware, such as operating systems, device drivers, and input/output (I/O) drivers.

The upgrade path 100 includes an interim environment and platform 104 established as a bridge between a legacy environment and platform 102 and an upgraded environment and platform 106. Briefly, in one example, the legacy environment and platform 102 include a computer system installed with a 32-bit operating system version 108a (e.g., a 32-bit version of the MICROSOFT WINDOWS 2000 operating system). The legacy environment includes a legacy application version X 112a (e.g., the SAP Enterprise Resource Planning (ERP) 4.6C software application) that is running on top of a first database version 110a (e.g., a MICROSOFT SQL Server 2000 database). The desired upgraded environment and platform 106 includes a computer system installed with a second 64-bit operating system version 108c (e.g., a 64-bit version of the MICROSOFT WINDOWS 2008 operating system), upon which an upgraded application version Y 112c (e.g., the SAP ECC 6.0 software application) runs on top of a third database version 110c (e.g., a 64-bit MICROSOFT SQL Server 2008 database).

No direct upgrade path is established between the legacy environment and platform 102 and the upgraded environment and platform 106. The software manufacturer, for example, may not have developed or released an automated process for moving from the legacy environment and platform 102 to the upgraded environment and platform 106. In some implementations, the software manufacturer may provide a customer support forum with workaround information for upgrading between otherwise unsupported environment and platform versions, however no workaround information may be available to the organization for upgrading between the legacy environment and platform 102 and the upgraded environment and platform 106.

If the organization were to attempt to individually upgrade components within the upgraded environment and platform 106, the upgrade attempt may result in one or more error conditions due the upgraded version of one component being incompatible with the legacy version of another component. For example, the installation process for the upgraded application version Y 112c may require that the platform onto which the application version Y 112c is to be installed has a 64-bit operating system, while the installation process for the legacy application version X 112a may require that the platform onto which the application version X 112a is to be installed has a 32-bit operating system. This situation causes a dilemma, where the operating system and the application both need to be upgraded for the upgraded environment and platform 106 to function.

In another example, the upgraded application version Y 112c may be incompatible with the first database version 110a, while the legacy application version X 112a may be incompatible with the third database version 110c. This database incompatibility, for example, may make it difficult or impossible to accurately migrate data between the legacy application version X 112a and the upgraded application version Y 112c. Without a direct upgrade path between the legacy application version X 112a and the upgraded application version Y 112c, a full system rebuild may have previously been the only option presented to the organization by the software manufacturer.

Rather than going through the expense and difficulty of fully rebuilding the legacy environment and platform 102, the interim environment and platform 104 may be established and temporarily populated with the contents of the database system generated through the legacy application version X 112a upon the legacy environment and platform 102. One or more components of the interim environment and platform 104 (e.g., a second database version 110b or a first 64-bit operating system version 108b), for example, may be backwards compatible with the upgraded environment and platform 106. While one or more of the components of the interim environment and platform 104 may not be forward compatible with the components of the legacy environment and platform 102, the installation process for the legacy application version X 112a may be modified, or 'tricked' into installing upon the interim environment and platform 104. For example, although the interim environment and platform 104 is installed with the first 64-bit operating system version 108b, the first 64-bit operating system version 108b may be installed using a compatibility mode, allowing interoperability with software programs written to conform to a 32-bit operating system.

One or more system file references, directory paths, or other variables specific to the first 64-bit operating system version 108b may be inserted within the installation process for the legacy application version X 112a (e.g., where information specific to the 32-bit operating system version 108a exists). This may allow the organization to trick the legacy application version X 112a into installing upon a different operating system or database version than anticipated by the installation program provided by the software manufacturer. For example, one or more of the components of the interim environment and platform 104 may not have been available on the market when the installation program for the legacy software application version X 112a was created.

In some implementations, the interim environment and platform 104 may be installed upon a separate hardware system from the legacy environment and platform 102 (e.g., different processor(s), computer(s), server(s), networking equipment, etc.).

To enable the migration of data from the legacy environment and platform 102 to the interim environment and platform 104, the application version X 112a may be modified to create an interim application version X.modified 112b. In some implementations, creating the interim application version X.modified 112b may include overriding the default installation process for the application version X 112a. For example, scripting information, installation files, or system files and directories may be edited or redirected to mimic the environment of the legacy environment and platform 102. The first 64-bit operating system version 108b, in another example, may be running in a 32-bit compatibility mode to create an environment more compatible with the interim application version X.modified 112b. Additionally, one or more files or settings related to the second database version 110b may be altered to mimic the first database version 110a of the legacy environment and platform 102.

After installation of the interim application version X.modified 112b, the information previously retained by the application version X 112a upon the first database version 110a may be migrated to the interim environment and platform 104. The configuration of a database system running within the application version X 112a, for example, may be backed up and ported to the interim environment and platform 104. Once the interim environment and platform 104 has been established and the application settings and digital contents (e.g., data or other information managed within the first database version 110a) have been ported from the legacy environment and platform 102, in some implementations, the data migration may be verified upon the interim environment and platform 104. For example, a testing process may be run upon the interim environment and platform 104 to verify the functionality and contents of the interim application version X.modified 112b within the second database version 110b. In some implementations, one or more of the functionalities of the interim application version X.modified 112b may fail due to the modified installation environment.

From the interim environment and platform 104, the upgrade path to the upgraded environment and platform 106 may include forward compatible upgrades of the first 64-bit operating system version 108b to the second 64-bit operating system version 108c or the second database version 110b to the third database version 110c upon a same hardware platform. In some implementations, one or more previously modified files, directories, system settings or other data or information may be returned to initial settings prior to upgrading between the interim environment and platform 104 and the upgraded environment and platform 106.

After upgrading the second database version 110b to the third database version 110c, the database system may be restored upon the third database version 110c. The interim application version X.modified 112b, similarly, may be upgraded to the upgraded application version Y 112c. After the interim environment and platform 104 has been upgraded to the upgraded environment and platform 106, the contents of the database system may be verified through the application version Y 112c or the third database version 110c.

Figure 2A:
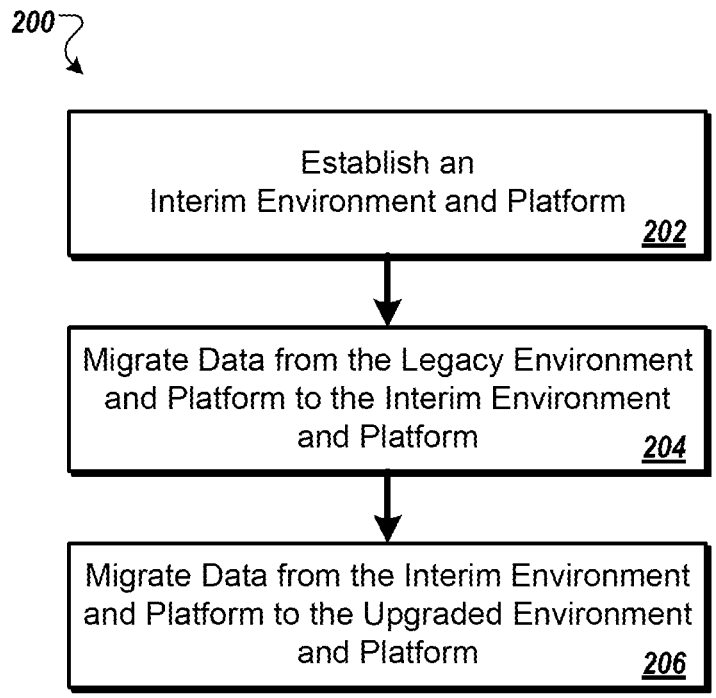
FIGS. 2A through 2C are flow diagrams illustrating example processes for migrating data from a legacy environment and platform to an upgraded environment and platform, using an interim environment and platform.

FIG. 2A is a flow diagram illustrating an example process 200 for migrating data from a legacy environment and platform to an upgraded environment and platform, using an interim environment and platform. Briefly, the process 200 describes a method for migrating data from a legacy environment installed on a legacy platform to an upgraded environment installed on a upgraded platform where there is a circumstance within the upgrade process which causes the legacy environment to not be forward compatible with the upgraded environment and platform and the upgraded environment to not be backward compatible with the legacy environment and platform. The process 200, for example, may be used within the example upgrade path 100 described in relation to FIG. 1.

The process 200 begins by establishing an interim environment and platform (202). The interim environment and platform, for example, may include one or more environment (e.g., software application or database) or platform (e.g., hardware, firmware, or operating system) components which are incompatible with the legacy environment or platform. For example, the legacy version may be written to install and run within a 32-bit operating system, while the interim environment and platform includes a 64-bit operating system. The individual components of the interim environment and platform, for example, may be selected to be backwards compatible with the upgraded environment and platform.

In some implementations, establishing the interim environment and platform includes determining that an installation process associated with the interim environment has automatically raised the compatibility mode associated with the interim environment, and lowering the compatibility mode associated with the interim environment. For example, the installation process may be made up of two or more installation processes that are not intended to be used together, and that are being performed sequentially or in parallel. In some implementations, the interim environment and platform may be installed upon a separate hardware system than the legacy environment and platform.

When installing a legacy software application upon the interim environment and platform, in some implementations, the installation process may be modified to allow the otherwise incompatible software application to install upon the interim environment and platform. For example, one or more installation files may be modified to point to elements (e.g., files, system variables, directories, etc.) found within the components of the interim environment and platform (e.g., operating system, firmware, or software application platform components). One or more entire system files, in one example, may be temporarily replaced during the installation process to mimic the environment of the legacy environment and platform.

Once the interim environment and platform has been established, data may be migrated from the legacy environment and platform to the interim environment and platform (204). The legacy software application, installed upon the legacy environment and platform, may manage a pool of data. This data, for example, may be stored in a manner which may not be capable of being immediately exported and provided to the upgraded environment and platform. For example, rather than straight text or table formatted information, the data may be stored within a priority format specific to the legacy software application or to a software application working in tandem with one or more additional software applications, such as a legacy database platform. If not for the interim environment and platform, for example, the upgraded environment and platform may need to be populated with the information contained within this pool of data from scratch. In some implementations, upon completion of the migration of the data, a test may be run upon the interim environment and platform to verify the validity and completeness of the migrated data.

The data is migrated from the interim environment and platform to the upgraded environment and platform (206). In some implementations, the interim environment and platform is directly upgraded to create the upgraded environment and platform. For example, standard software manufacturer-provided upgrade installation executables for the operating system, firmware, or one or more software applications may be applied directly upon the interim environment and platform. If one or more system files or variables were modified to enable the installation of the legacy software application upon the interim environment and platform, this information may be returned to its original format prior to upgrading the one or more components. If desired, the data may be exported for storage prior to upgrade. For example, while the legacy software application is being upgraded to the upgraded software application, or while an underlying database application is being upgraded, the data may be exported to a storage region so that it is not affected by the installation process. In some implementations, the upgraded environment and platform may be established upon a separate hardware system. In some examples, a collation conversion may be performed on the data before migrating the data to the upgraded environment and platform.

Figure 2B:
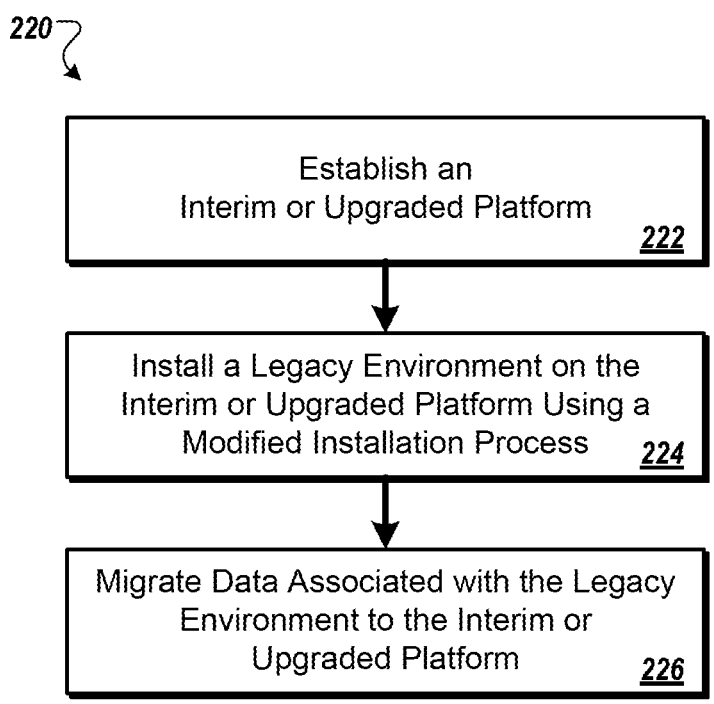

FIG. 2B is a flow diagram illustrating another example process 220 for migrating data from a legacy environment and platform to an upgraded environment and platform, using an interim environment and platform. Briefly, the process 220 includes the actions of modifying an installation process associated with a legacy environment to allow the legacy environment to be installed on an interim environment and platform or an upgraded environment and platform, where, absent modification, the installation process does not allow the legacy environment to be installed on the interim environment and platform or the upgraded environment and platform. The actions also include installing the legacy environment on the interim environment and platform or the upgraded environment and platform using the modified installation process, and migrating data associated with a legacy application to the interim environment and platform or the upgraded environment and platform.

The process 220 begins with establishing an interim or upgraded platform (222). The establishment of the interim or upgraded platform, for example, may be done similarly as described in relation to the first process stage 202 of the process 200 of FIG. 2A.

A legacy environment is installed on the interim or upgraded platform using a modified installation process (224). In some implementations, modifying the installation process may include replacing a data conversion and re-conversion operation with a copy operation before invoking the installation process.

Data associated with the legacy environment and platform is migrated to the interim or upgraded platform (226). If the installation process was modified to replace a conversion and re-conversion operation with a copy operation, in some implementations, data migration may include copying the data from the legacy environment and platform to the interim or upgraded platform using the copy operation instead of the data conversion and re-conversion operation. The interim or upgraded platform may store the copy of the data.

Figure 2C:
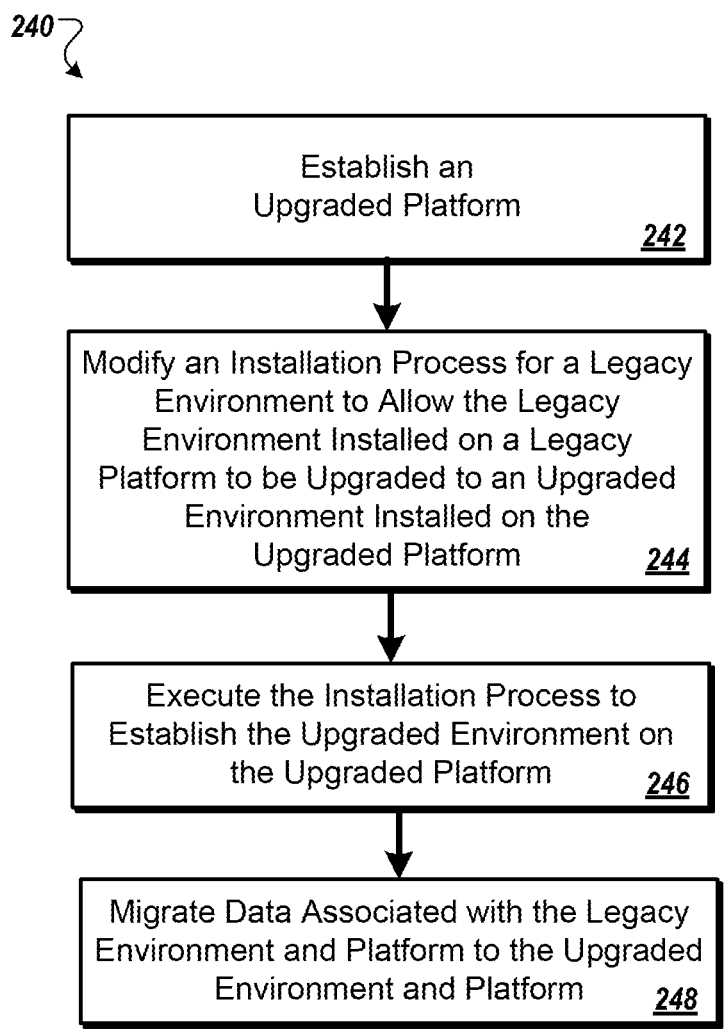

FIG. 2C is a flow diagram illustrating another example process 240 for migrating data from a legacy environment and platform to an upgraded environment and platform, using an interim environment and platform. Briefly, the process 240 includes the actions of modifying an installation process for a legacy environment to allow the legacy environment installed on a legacy environment and platform to be upgraded to an upgraded environment installed on an upgraded environment and platform, where the installation process does not allow the legacy environment to be installed on the upgraded environment and platform, and where an installation process for the upgraded environment does not allow the upgraded environment to be installed on the legacy environment and platform. The actions also include migrating data associated with the legacy environment to the upgraded environment.

The process 240 begins with establishing an upgraded platform (242). The upgraded platform, for example, may include one or more hardware, firmware, or operating system components which are incompatible with a legacy environment or platform. Optionally, the upgraded platform may include one or more environment (e.g., software application or database) components. In some implementations, one or more individual components of upgraded environment and platform may be selected to be backwards compatible with an interim environment and platform. In some implementations, the upgraded platform includes a legacy operating system.

An installation process for a legacy environment is modified to allow the legacy environment installed on a legacy platform to be upgraded to an upgraded environment installed on the upgraded platform (244). In some implementations, modifying the installation process may include replacing a data conversion and re-conversion operation with a copy operation before invoking the installation process.

The installation process is executed to establish the upgraded environment on the upgraded platform (246). If the upgraded platform includes the legacy operating system, in some implementations, the installation process may be paused after an operating system confirmation operation has been performed, and before an upgraded operating system requirement operation is performed. During the pause, the legacy operating system may be replaced with the upgraded operating system. In some examples, the replacement of the legacy operating system with the upgraded operating system may include replacing files associated with the legacy operating system with files associated with the upgraded operating system. The installation process may then be restarted.

Data associated with the legacy environment and platform is migrated to the upgraded environment and platform (248). If the installation process was modified to replace a conversion and re-conversion operation with a copy operation, in some implementations, data migration may include copying the data from the legacy environment and platform to the upgraded environment and platform using the copy operation instead of the data conversion and re-conversion operation.

In some implementations, migrating the data from the legacy environment to the upgraded environment and platform includes performing a restore operation by the upgraded platform to import a copy of the data stored by an interim environment and platform.

Figure 3:
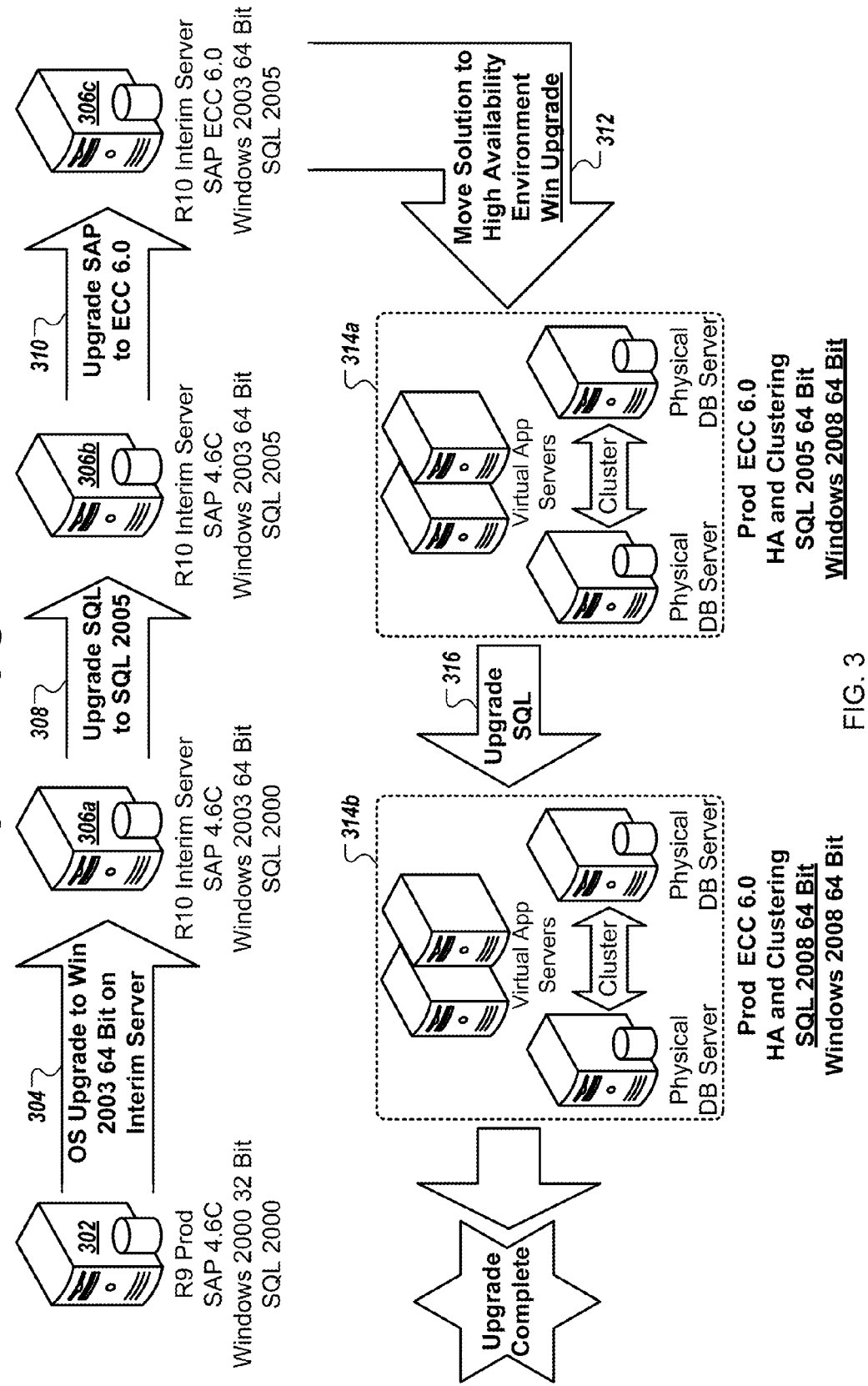
FIG. 3 illustrates an example of an upgrade path between incompatible environments and platforms.

FIG. 3 is a block diagram illustrating one implementation of an upgrade path 300 between incompatible environment and platform configurations. Briefly, the upgrade path 300 includes a Release 9 (R9) production server 302 which is being upgraded to a high availability cluster server system 314 through a Release 10 (R10) interim server 306. The R10 platform, for example, can include one or more updated or upgraded components of the R9 platform.

The R9 production server 302 is configured with SAP R/3 Enterprise Resource Planning (ERP) 4.6C software application, SQL Server 2000 database server, and Windows 2000 32-bit operating system. In some implementations, prior to upgrade, the database system established upon the R9 production server 302 may be backed up, saving the current data upon a separate storage device. In other implementations, the backup may be delayed due to the nature of the production environment (e.g., the data continues to undergo changes).

In a first upgrade step 304, the Windows 2000 operating system is upgraded to the Windows 2003 64-bit operating system upon a first stage 306a of the R10 interim server 306. The R10 interim server 306, for example, may be configured upon separate hardware than the R9 production server 302 to allow the R9 production server to continue to function during the process of the upgrade path 300. In some implementations, the upgrade includes enabling a 32-bit compatibility mode setting. The first stage 306a of the R10 interim server 306 is additionally configured with the SAP R/3 ERP 4.6C software application and the SQL Server 2000 database server. Although the SAP R/3 ERP 4.6C software application may not be forward compatible with the environment or platform configuration of the first stage 306a, the SAP R/3 ERP 4.6C software application may be tricked into installing upon the first stage 306a by modifying or bypassing established installation procedures using a well-documented path.

In a second upgrade step 308, the SQL Server 2000 database server is upgraded to the SQL Server 2005 database server, moving the R10 interim server 306 into a second stage 306b. There may be no established upgrade path between the SQL Server 2000 database server and the SQL Server 2005 database server within the configuration of the R10 interim server 306 (e.g., upon the Windows 2003 64-bit operating system). One or more modifications to the installation procedure may be made to trick SQL Server 2005 database server into installing upon the second stage 306b of the R10 interim server 306.

In a third upgrade step 310, the SAP R/3 ERP 4.6C software application is upgraded to the SAP ERP Central Component (ECC) 6.0 software application, moving the R10 interim server 306 into a third stage 306c. SAP ECC 6.0 may be backward compatible with the configuration of the second stage 306b of the R10 interim server 306, allowing a standard upgrade installation. In some implementations, one or more system variables, directory paths, or file contents, previously modified to enable the configuration of the second stage 306b, are reinitialized to allow for a direct upgrade. After the upgrade has been achieved, the database system established upon the R9 production server 302 may be backed up and migrated to the third stage 306c of the R10 interim server 306.

In a fourth upgrade step 312, the installation achieved through the third stage 306c of the R10 interim environment and platform 306 is moved to a high availability cluster server system 314. The upgrade step 312 includes upgrading from the Windows 2003 64-bit operating system to the Windows 2008 64-bit operating system and migrating data between software platforms.

A first stage 314a of the high availability cluster server system 314 is configured with the SAP ECC 6.0 software application, the SQL Server 2005 database server, and the Windows 2008 64-bit operating system. In a fifth upgrade step 316, the SQL Server 2005 database server is upgraded to the SQL 2008 64-bit database server, resulting in a second stage 314b of the high availability cluster server system 314. In some implementations, the database system established upon the SQL Server 2005 64-bit database server within the high availability cluster server system 314 may be backed up and restored within the SQL server 2008 64-bit database server.

At this point, the upgrade path 300 is complete. However, one or more additional tests or database setup modifications may occur to prepare the high availability cluster server system 314 for production mode.

FIGS. 4A, 5A, 6A, and 7A illustrate specific problems that may be encountered when attempting to upgrade a legacy environment installed on a legacy platform to an upgraded environment installed on an upgraded platform. FIGS. 4B, 5B, 6B and 7B illustrate upgrade paths, according to various example implementations, that may be established to overcome these and other problems.

Figure 4A:
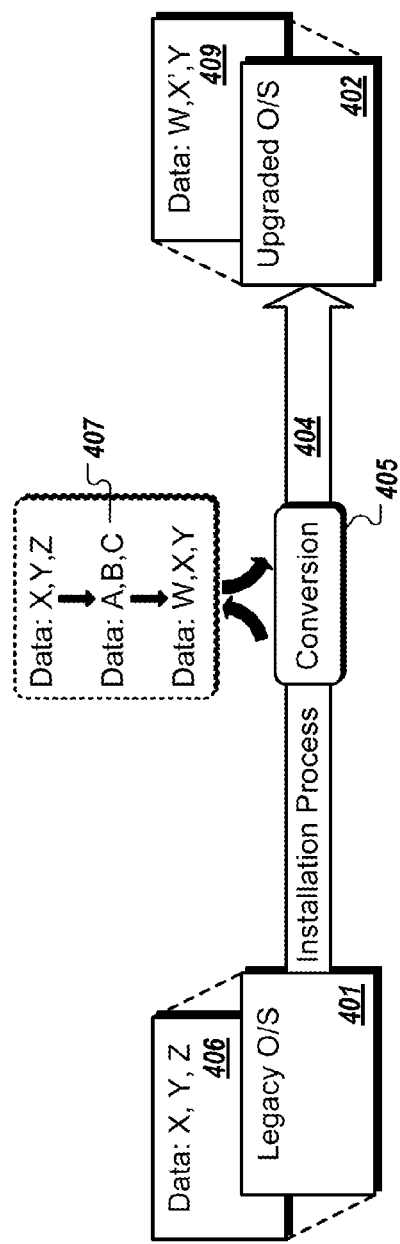
FIGS. 4A, 5A, 6A, and 7A each illustrate a specific problem that may be encountered when attempting to upgrade a legacy environment installed on a legacy platform to an upgraded environment installed on an upgraded platform.

FIG. 4A depicts a first problem that may be encountered when attempting to upgrade a legacy operating system 401 to an upgraded operating system 402 using an installation process 404. The installation process 404 includes a conversion operation 405 that, among other things, obtains data 406 that is used by the legacy operating system 401, converts the data 406 to non-system-specific data 407 (e.g., raw data), and re-converts the non-system-specific data 407 to data 409 that is capable of being used by the upgraded operating system 402. In one example implementation, the conversion operation 405 invokes the R3LOAD table export and import tool, a program available through the SAP kernel.

The conversion operation 405 may be time consuming, and may introduce errors into the data 406 that may cause the installation process 404 to fail, that may impede the migration of the data 406 to the upgraded environment and platform, or that may otherwise render the legacy environment to be not fully compatible with the upgraded environment and platform. Specifically, and as illustrated in FIG. 4A, the conversion of the data 406 to the non-system-specific data 407 may result in changes being made to the data 406 (illustrated as data 406 "X, Y, Z" being changed to data 407 "A, B, C"). Although the re-conversion of the data 407 to the data 409 should result in data that is the same as the data 406, the conversion and subsequent re-conversion actions may result in new data being added to the data 406 (e.g., new data "W" in data 409), in data being omitted from data 406 (e.g., omitted data "Z" which is absent from data 409), or in a modification of the data 406 (e.g., data "X" from data 406 being modified to data "X" in data 409).

In order to overcome the problems caused by the conversion operation 405, an enhanced installation process 451 replaces the conversion operation 405 with a copy operation 452. For instance, and instead of invoking the R3LOAD table export and import tool, the enhanced installation process 451 may invoke the R3COPY homogeneous system copy tool, available as an SAP kernel executable.

Figure 4B:
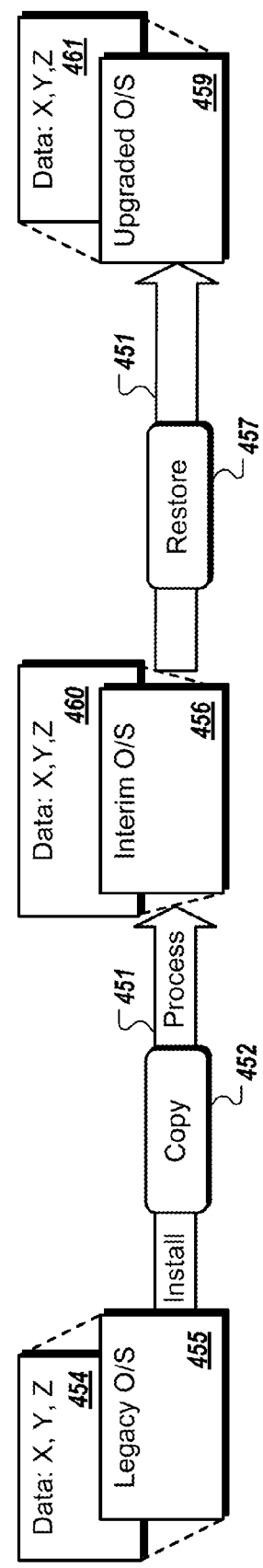
FIGS. 4B, 5B, 6B, and 7B each illustrate upgrade paths, according to various example implementations, that may be established to overcome the problems illustrated in FIGS. 4A, 5A, 6A, and 7A, respectively, and to overcome other problems.

As shown in FIG. 4B, using the enhanced installation process 451, data 454 that is used by a legacy operating system 455 is copied, by the copy operation 452 of the enhanced installation process 451, to an interim operating system 456, and is imported, by a restore operation 457, to an upgraded operating system 459. Notably, the copy operation 452 and restore operation 457 do not require the data 454 to be converted or re-converted. As such, data 460 that results from the copy operation 452, and data 461 that results from the restore operation 457 are identical to, or are substantially similar to, data 454.

Figure 5A:
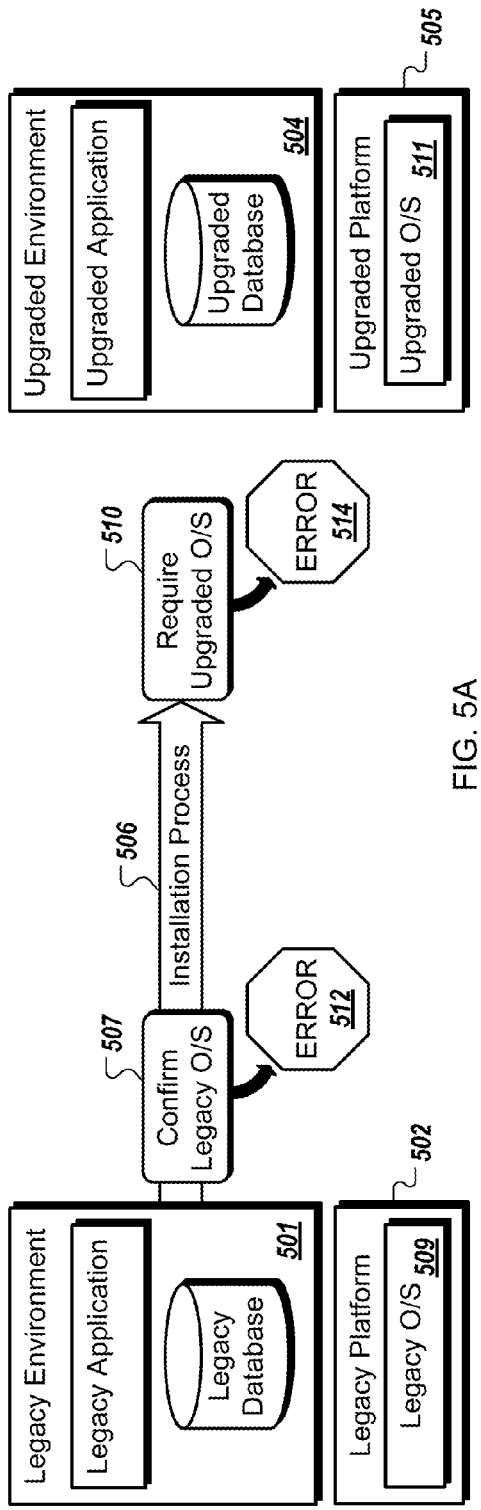

FIG. 5A depicts a second problem that may be encountered when attempting to upgrade a legacy environment 501 and a legacy platform 502 to an upgraded environment 504 and an upgraded platform 505, using an installation process 506. The installation process 506 may include an inconsistency in that, during a confirmatory operation 507 that occurs early in the installation process 506, a check is performed to confirm that the upgraded platform 505 onto which the upgraded environment 504 is being installed is using a legacy operating system 509 yet, at a later time, an operation 510 is performed that requires the upgraded platform 505 to be using an upgraded operating system 511.

Such an inconsistency may arise, for example, where the installation process 506 is actually made up of two or more different installation processes that are not intended to be used together, and that are being performed sequentially or in parallel. Regardless of how the inconsistency may arise, however, a user may attempt to overcome the problem by beginning the installation process 506 upon a platform that configured with the upgraded operating system 511, however this attempt will trigger an error 512 when the confirmatory operation 507 determines that the upgraded platform 505 is not using the legacy operating system 509, thereby ending the installation process 506. Alternatively, the user may attempt to overcome the problem by performing the installation process upon a platform that is configured with the legacy operating system 509, however this attempt will also trigger an error 514 when the operation 510 is performed, requiring the upgraded operating system 511. In any case, the installation process 506 fails, and the legacy environment 501 is not upgraded to the upgraded environment 504.

Figure 5B:
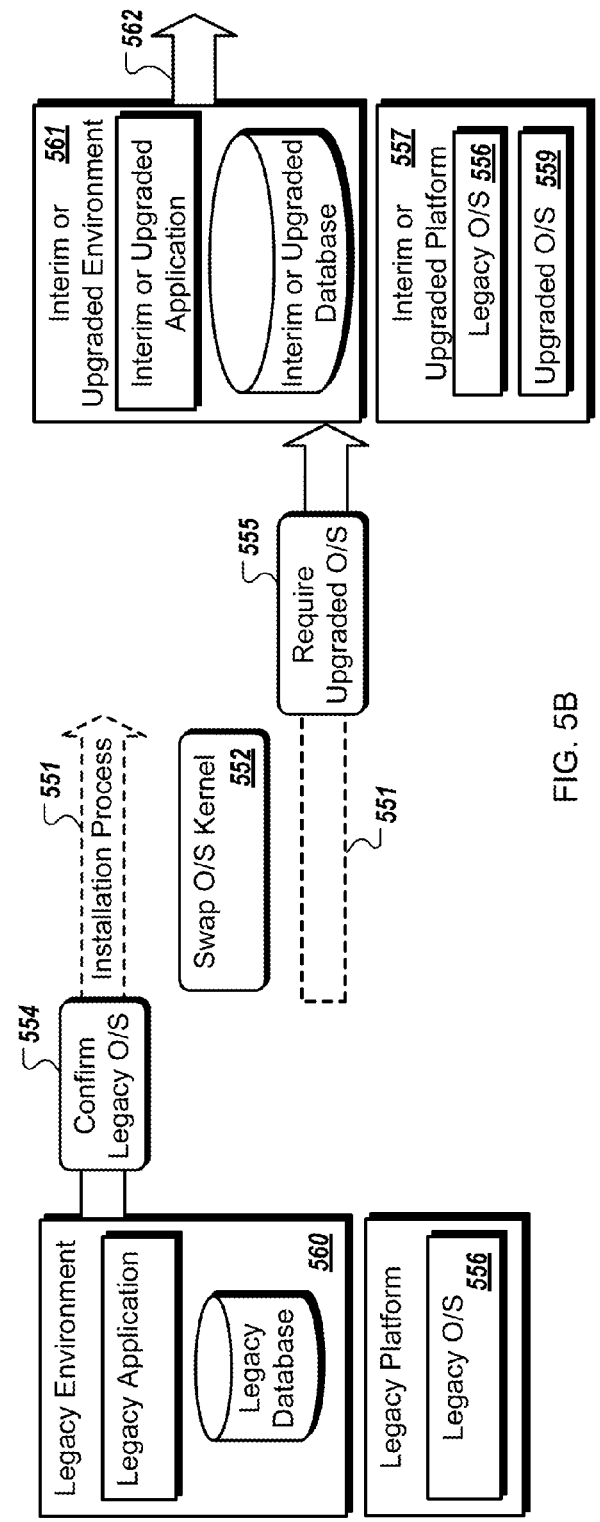

In order to overcome this problem, and as shown in FIG. 5B, an enhanced installation process 551 introduces an operating system kernel swap operation 552 at some time after a confirmatory operation 554 (which is similar to confirmatory operation 507) has occurred, but before an operation 555 (which is similar to operation 510) has occurred. Specifically, a legacy operating system 556 is installed on an interim platform 557 (or an upgraded platform), and the enhanced installation process 551 is performed on the interim platform 557. At some point after the confirmatory operation 554 occurs (or after the last confirmatory operation occurs), the enhanced installation process 551 is automatically or manually paused, files associated with the legacy operating system 556 are removed and replaced by files associated with an upgraded operating system 559, and registry, profile, configuration, or other system settings are changed to reflect that the upgraded operating system 559 has been installed on the interim platform 557. The interim platform 557 is rebooted, and the enhanced installation process 551 is restarted from the point at which it was paused.

Using the enhanced installation process 551, no error is triggered by the confirmatory operation 554, since the interim platform 557 is using the legacy operating system 556 at the time when the check is performed to confirm that the interim platform 557 is using the legacy operating system 556. Furthermore, no error is triggered by the operation 555, since the interim platform 557 is using the upgraded operating system 559 at the time when the operation 555 is performed. Accordingly, by using the operating system kernel swap operation 552 at an interim point, the enhanced installation process 551 is able to finish, and a legacy environment 560 is upgraded to an interim environment 561 (or an upgraded environment).

An additional process 562, such as a process that invokes an import operation or a restore operation, may be used to upgrade the interim environment 561 to the upgraded environment. The additional process 562 may be an established installation process.

Figure 6A:
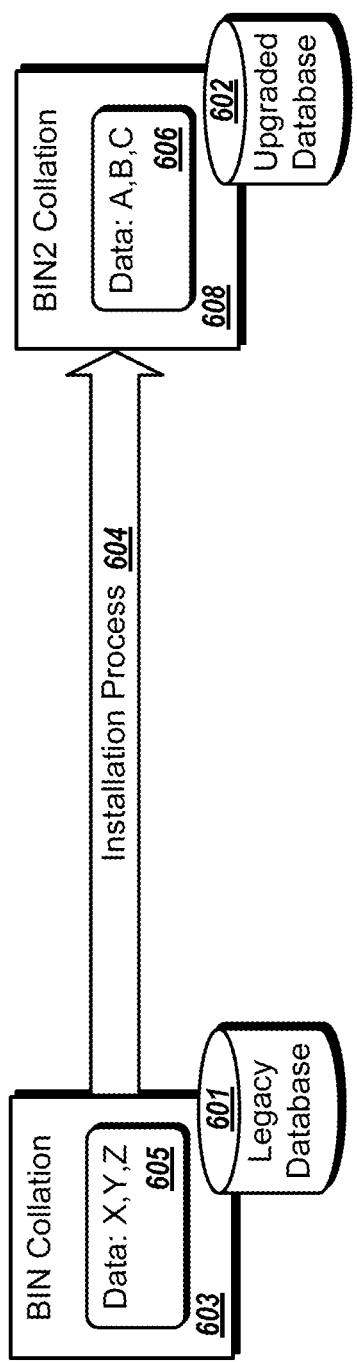

FIG. 6A depicts a third problem that may be encountered when attempting to upgrade a legacy database 601 to an upgraded database 602, using an installation process 604. Specifically, the legacy database 601 may have a first collation property 603 (e.g., the BIN collation property, associated with MICROSOFT SQL SERVER 2000), and the upgraded database 602 may require a second collation property 608 (e.g., the BIN2 collation property, associated with MICROSOFT SQL SERVER 2005 running on MICROSOFT WINDOWS 2003). In general, a "collation" algorithm includes both a process to define an order, corresponding to a process of comparing two values, and a sorting algorithm which places a set of data in the defined order. The BIN and the BIN2 collation properties are binary collations, used in sorting data based on a sequence of coded values defined by the locale and data type. The BIN collation property performs an incomplete code-point to code-point comparison for Unicode data, while the BIN2 collation property performs a code-point comparison collation.

Because the upgrade process 604 may require that the collation properties of the legacy database 601 and the upgraded database 602 be the same, errors may be introduced when the upgrade process is performed. For example, by failing to take the differences in collation property into account, new data may be added to data 605 of the legacy database 601, data may be omitted from data 605, or data 605 may be modified. Specifically, and as illustrated in FIG. 6A, the migration of the data 605 to the data 606 may result in changes being made to the data 606 (illustrated as data 605 "X, Y, Z" being changed to data 606 "A, B, C").

Figure 6B:
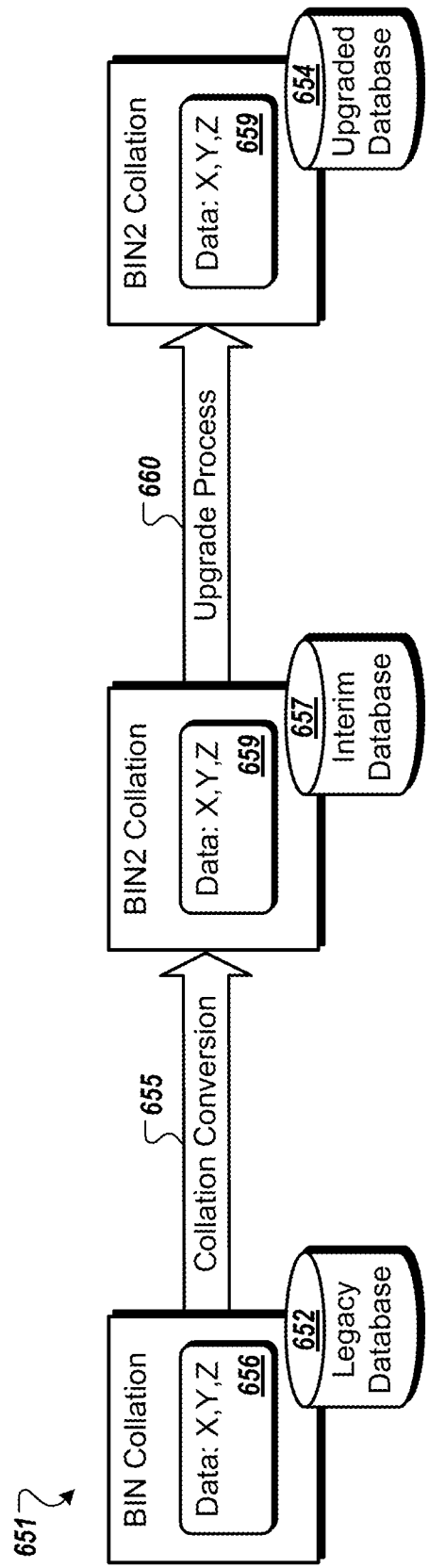

As shown in FIG. 6B, an enhanced installation process 651 accounts for the potential differences in collation property between a legacy database 652 and an upgraded database 654 by performing a collation conversion process 655 on data 656 of the legacy database 652 (thereby populating an interim database 657 or the legacy database 652 with data 659), before performing an upgrade process 660 on the data 659. For example, when the data 656 has a BIN collation property, the collation conversion process 655 may be performed on the data 656 to convert the data 656 to data 659 which has a BIN2 collation property.

After the collation conversion process 655 has been completed, the upgrade process 660 may be performed to upgrade the legacy database 652 or the interim database 657 to the upgraded database 654, without introducing errors to the data 656. Notably, the collation conversion process 655 should be performed before the upgrade process 660, and not after, to avoid the introduction of errors due to the differences in the collation properties of the legacy database 652 and the upgraded database 654.

Figure 7A:
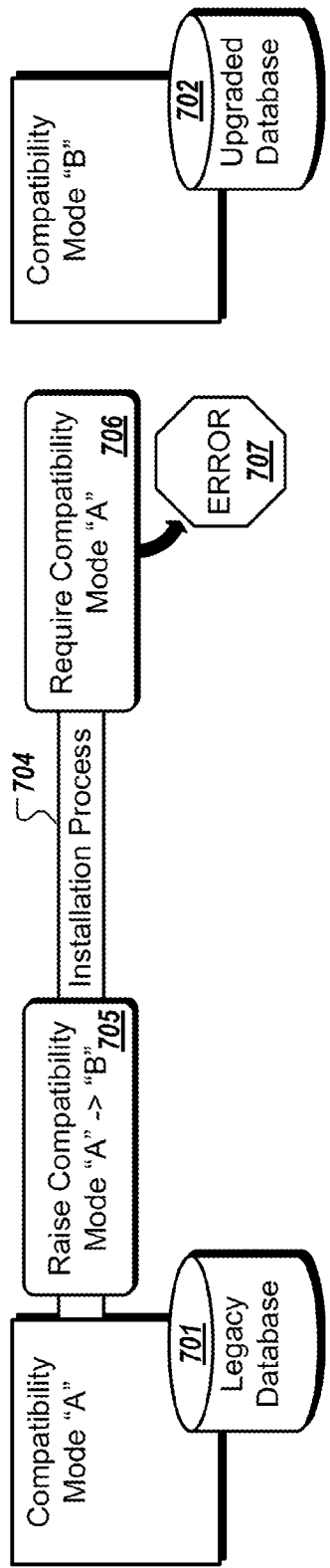

FIG. 7A depicts a fourth problem that may be encountered when attempting to upgrade a legacy database 701 to an upgraded database 702. Specifically, an installation process 704 may raise an inconsistency in that, during an operation 705 that occurs early in the installation process 704, a compatibility mode of the legacy database 701 is automatically raised from an initial level to an upgraded level (e.g., compatibility mode 80 to compatibility mode 90) yet, at a later time, an operation 706 is performed that requires the legacy database 701 to be set at the initial level.

The term "compatibility mode" may describe a software mechanism in which a computing platform emulates older hardware or firmware components, such as, in some examples, a previous version of processor or operating system. The compatibility mode emulation may provide the ability for obsolete environment components, such as a software application or database environment, to remain compatible with the computing platform's newer environment or platform components.

Such an inconsistency in compatibility mode expectations within the installation process 704 may arise, for example, where the installation process 704 is actually made up of two or more different installation processes that are not intended to be used together, and that are being performed sequentially or in parallel. Regardless of how the inconsistency may arise, however, the fact that the compatibility mode is automatically raised during the operation 705, and that the lower compatibility mode is required by the later operation 706, raises an error 707 that causes the installation process 704 to fail.

Figure 7B:
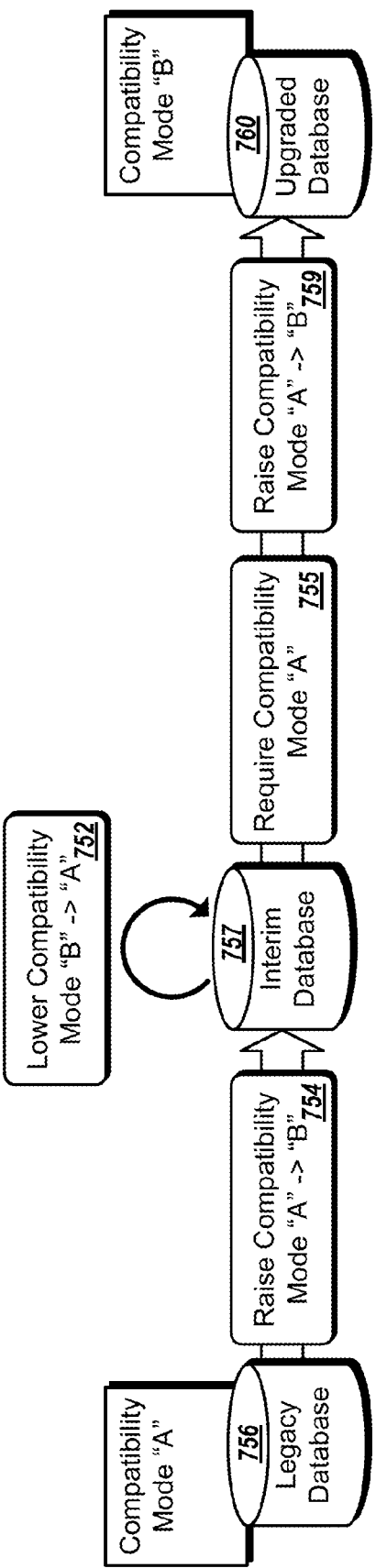

As shown in FIG. 7B, an enhanced installation process 751 is used to overcome this problem by introducing a compatibility mode modification operation 752 that lowers the compatibility mode from the upgraded level back to the initial level. The compatibility mode modification operation 752 is performed after an operation 754 (which is similar to operation 705) raises the compatibility mode, but before a require compatibility mode operation 755 (which is similar to operation 706) occurs.

In more detail, the enhanced installation process 751 is performed on a legacy database 756, which is set with an initial compatibility mode value (e.g., "compatibility mode A"). Among several operations performed during the enhanced installation process 751, the operation 754 is performed on the legacy database 756, which increases the compatibility mode of the legacy database 756 from the initial compatibility mode value to the upgraded compatibility mode value (e.g., from "compatibility mode A" to "compatibility mode B"), and is thereby established as an interim database 757.

The installation process 751 is automatically or manually paused, and the compatibility mode modification operation 752 is performed on the interim database 757 to lower the compatibility mode from the upgraded compatibility mode value (e.g., from compatibility mode "B" to a lower compatibility mode value, such as to the initial compatibility mode value, "compatibility mode A"). The enhanced installation process 751 is restarted from the point at which it was paused, and no error is triggered by the require compatibility mode operation 755. A raise compatibility mode operation 759 is performed on the interim database 757 after the require compatibility mode operation 755 is performed, and the compatibility mode is raised from the lower compatibility mode value to the upgraded compatibility mode value or another elevated value (e.g., from compatibility mode "A" to a higher compatibility mode, such as the upgraded compatibility mode value, "compatibility mode B," or another elevated value, "compatibility mode C"). The raise compatibility mode operation 759 results in an upgraded database 760.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A computer-implemented method for migrating data from a legacy environment installed on a legacy environment and platform, to an upgraded environment installed on a upgraded environment and platform, where the legacy environment is not compatible with the upgraded environment and platform, and where the upgraded environment is not compatible with the legacy environment and platform, the instructions operable, when executed by the one or more computers, the method comprising:
    establishing an interim environment and platform;
    invoking an installation process associated with the interim environment, where the installation process includes:
        a compatibility mode modifying operation that automatically modifies a compatibility mode associated with the interim environment from an initial compatibility level to an upgraded compatibility level, and
        a compatibility mode confirmation operation that occurs after the compatibility mode modifying operation, wherein the compatibility mode confirmation operation confirms that the compatibility mode associated with the interim environment is set at the initial compatibility level;
    determining that the installation process associated with the interim environment and platform has performed the compatibility mode modifying operation to automatically modify the compatibility mode associated with the interim environment from the initial compatibility level to the upgraded compatibility level, then further modifying the compatibility mode associated with the interim environment from the upgraded compatibility level to the initial compatibility level before the installation process performs the compatibility mode confirmation operation;
    migrating the data from the legacy environment and platform to the interim environment and platform; and
    migrating the data from the interim environment and platform to the upgraded environment and platform.

2. The method of claim 1, where the installation process includes a compatibility mode lowering operation that automatically lowers a compatibility mode associated with the interim environment from the upgraded compatibility level to the initial compatibility level, where a compatibility mode lowering operation occurs after the compatibility mode modifying operation.

3. The method of claim 1, where the installation process includes:
    a first sub-installation process associated with the upgraded compatibility level; and
    a second sub-installation process associated with the initial compatibility level.

4. The method of claim 3, where the first sub-installation process is performed after the compatibility mode modifying operation but before the compatibility mode confirmation operation, and the second sub-installation process is performed after the compatibility mode confirmation operation.

5. The method of claim 1, where migrating the data from the legacy environment and platform to the interim environment and platform is performed in response to determining that the installation process associated with the interim environment and platform has performed the compatibility mode modifying operation to automatically modify the compatibility mode associated with the interim environment from the initial compatibility level to the upgraded compatibility level, then further modifying the compatibility mode associated with the interim environment from the upgraded compatibility level to the initial compatibility level before the installation process performs the compatibility mode confirmation operation.

6. The method of claim 1, where migrating the data from the interim environment and platform to the upgraded environment and platform comprises:
    performing a second compatibility mode modifying operation that automatically modifies the compatibility mode associated with the interim environment from the initial compatibility level to the upgraded compatibility level or another compatibility level greater than the initial compatibility level.

7. A non-transitory computer storage medium encoded with a computer program for migrating data from a legacy environment installed on a legacy environment and platform, to an upgraded environment installed on a upgraded environment and platform, where the legacy environment is not compatible with the upgraded environment and platform, and where the upgraded environment is not compatible with the legacy environment and platform, the program comprising instructions that when executed by a data processing apparatus cause the data processing apparatus to perform operations comprising:
    establishing an interim environment and platform;
    invoking an installation process associated with the interim environment, where the installation process includes:
        a compatibility mode modifying operation that automatically modifies a compatibility mode associated with the interim environment from an initial compatibility level to an upgraded compatibility level, and
        a compatibility mode confirmation operation that occurs after the compatibility mode modifying operation, wherein the compatibility mode confirmation operation confirms that the compatibility mode associated with the interim environment is set at the initial compatibility level;
    determining that the installation process associated with the interim environment and platform has performed the compatibility mode modifying operation to automatically modify the compatibility mode associated with the interim environment from the initial compatibility level to the upgraded compatibility level, then further modifying the compatibility mode associated with the interim environment from the upgraded compatibility level to the initial compatibility level before the installation process performs the compatibility mode confirmation operation;
    migrating the data from the legacy environment and platform to the interim environment and platform; and
    migrating the data from the interim environment and platform to the upgraded environment and platform.

8. The medium of claim 7, where the installation process includes a compatibility mode lowering operation that automatically lowers a compatibility mode associated with the interim environment from the upgraded compatibility level to the initial compatibility level, where a compatibility mode lowering operation occurs after the compatibility mode modifying operation.

9. The medium of claim 7, where the installation process includes:
a first sub-installation process associated with the upgraded compatibility level; and
a second sub-installation process associated with the initial compatibility level.

10. The medium of claim 9, where the first sub-installation process is performed after the compatibility mode modifying operation but before the compatibility mode confirmation operation, and the second sub-installation process is performed after the compatibility mode confirmation operation.

11. The medium of claim 7, where migrating the data from the legacy environment and platform to the interim environment and platform is performed in response to determining that the installation process associated with the interim environment and platform has performed the compatibility mode modifying operation to automatically modify the compatibility mode associated with the interim environment from the initial compatibility level to the upgraded compatibility level, then further modifying the compatibility mode associated with the interim environment from the upgraded compatibility level to the initial compatibility level before the installation process performs the compatibility mode confirmation operation.

12. The medium of claim 7, where migrating the data from the interim environment and platform to the upgraded environment and platform comprises:
performing a second compatibility mode modifying operation that automatically modifies the compatibility mode associated with the interim environment from the initial compatibility level to the upgraded compatibility level or another compatibility level greater than the initial compatibility level.

13. The medium of claim 7, where the legacy environment and platform includes a 32-bit version of an operating system, the interim environment and platform includes a 64-bit version of the operating system, and the upgraded environment and platform includes a 64-bit version of another operating system.

14. A system comprising:
one or more computers; and
one or more storage devices storing instructions for migrating data from a legacy environment installed on a legacy environment and platform, to an upgraded environment installed on a upgraded environment and platform, where the legacy environment is not compatible with the upgraded environment and platform, and where the upgraded environment is not compatible with the legacy environment and platform, the instructions operable, when executed by the one or more computers, to cause the one or more computers to perform operations comprising:
establishing an interim environment and platform;
invoking an installation process associated with the interim environment, where the installation process includes:
a compatibility mode modifying operation that automatically modifies a compatibility mode associated with the interim environment from an initial compatibility level to an upgraded compatibility level, and
a compatibility mode confirmation operation that occurs after the compatibility mode modifying operation, wherein the compatibility mode confirmation operation confirms that the compatibility mode associated with the interim environment is set at the initial compatibility level;
determining that the installation process associated with the interim environment and platform has performed the compatibility mode modifying operation to automatically modify the compatibility mode associated with the interim environment from the initial compatibility level to the upgraded compatibility level, then further modifying the compatibility mode associated with the interim environment from the upgraded compatibility level to the initial compatibility level before the installation process performs the compatibility mode confirmation operation;
migrating the data from the legacy environment and platform to the interim environment and platform; and
migrating the data from the interim environment and platform to the upgraded environment and platform.

15. The system of claim 14, where the installation process includes a compatibility mode lowering operation that automatically lowers a compatibility mode associated with the interim environment from the upgraded compatibility level to the initial compatibility level, where a compatibility mode lowering operation occurs after the compatibility mode modifying operation.

16. The system of claim 14, where the installation process includes:
a first sub-installation process associated with the upgraded compatibility level; and
a second sub-installation process associated with the initial compatibility level.

17. The system of claim 16, where the first sub-installation process is performed after the compatibility mode modifying operation but before the compatibility mode confirmation operation, and the second sub-installation process is performed after the compatibility mode confirmation operation.

18. The system of claim 14, where migrating the data from the legacy environment and platform to the interim environment and platform is performed in response to determining that the installation process associated with the interim environment and platform has performed the compatibility mode modifying operation to automatically modify the compatibility mode associated with the interim environment from the initial compatibility level to the upgraded compatibility level, then further modifying the compatibility mode associated with the interim environment from the upgraded compatibility level to the initial compatibility level before the installation process performs the compatibility mode confirmation operation.

19. The system of claim 14, where migrating the data from the interim environment and platform to the upgraded environment and platform comprises:
performing a second compatibility mode modifying operation that automatically modifies the compatibility mode associated with the interim environment from the initial compatibility level to the upgraded compatibility level or another compatibility level greater than the initial compatibility level.

20. The system of claim 14, where the legacy environment and platform includes a 32-bit version of an operating system, the interim environment and platform includes a 64-bit version of the operating system, and the upgraded environment and platform includes a 64-bit version of another operating system.

* * * * *